Aug. 22, 1967  G. F. RITTER, JR  3,337,317
METHOD AND APPARATUS FOR PRODUCING A CONTINUOUS GLASS RIBBON
Original Filed June 8, 1959
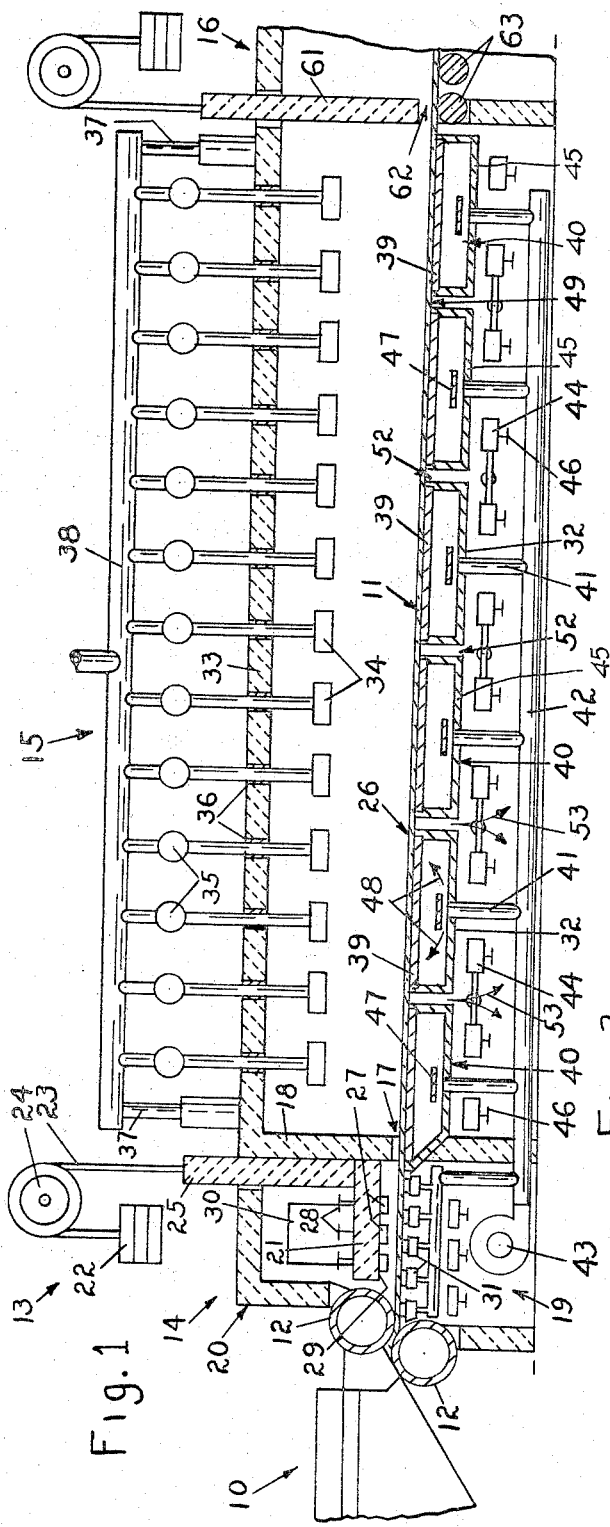
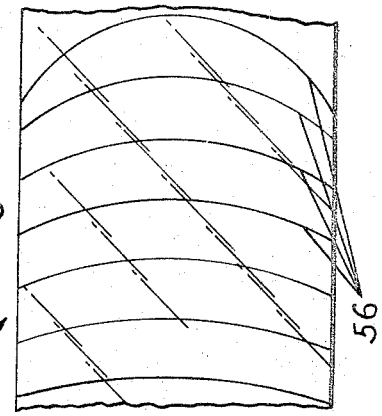
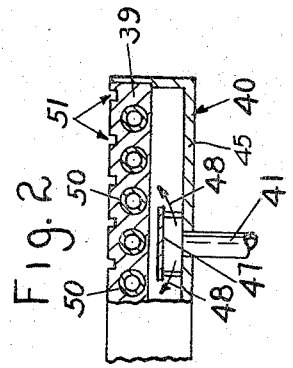
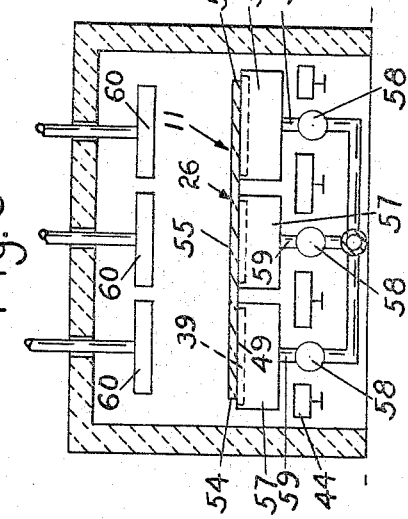
INVENTOR.
George F. Ritter, Jr.
BY
Nobbe & Swope
ATTORNEYS

United States Patent Office 3,337,317
Patented Aug. 22, 1967

3,337,317
METHOD AND APPARATUS FOR PRODUCING A CONTINUOUS GLASS RIBBON
George F. Ritter, Jr., Toledo, Ohio, assignor to Libby-Owens-Ford Glass Company, Toledo, Ohio, a corporation of Ohio
Continuation of application Ser. No. 818,595, June 8, 1959. This application July 2, 1962, Ser. No. 208,181
13 Claims. (Cl. 65—25)

The present application is a continuation of application Ser. No. 818,595, filed June 8, 1959, and now abandoned.

This invention broadly relates to the manufacture of flat glass in continuous ribbon form and is more particularly directed to a novel method and apparatus for supporting and treating the glass ribbon after it has been formed.

In the manufacture of plate glass, molten glass flowing from the working end of a tank furnace is normally rolled into a continuous ribbon between a pair of forming rolls which reduce the ribbon to the desired thickness. Upon emerging from the rolls, the glass ribbon is in a semiplastic state and must be supported in some fashion, in order to prevent sagging or buckling, until it is passed into the lehr where it is cooled and thereby hardened into final form.

Heretofore, so-called tray rolls were most commonly employed to receive the ribbon from the forming rolls. However, an improved method and apparatus for supporting a continuous glass ribbon is shown in U.S. Patent No. 2,878,621 issued to James T. Zellers, Jr. and George F. Ritter, Jr. on Mar. 24, 1959, which includes floating the glass on a cushion of air. While the method and apparatus of that patent is completely satisfactory for supporting the glass ribbon in its intended manner, the glass supporting phase of the present invention supplies additional advantages and is generally more desirable than that disclosed in the aforementioned patent.

With the increased use of plate glass, i.e. glass having ground and polished surfaces, it has become most desirable for many reasons to form a glass ribbon in which at least one, and preferably both, surfaces are as flat as possible and which surfaces are free from defects and especially that defect known as sheen. Although such a ribbon or sheet has many advantages, it is believed that there are two, to be now discussed, which are of prime significance.

First, if at least one surface of the ribbon is absolutely flat, this will minimize the amount of grinding, i.e. glass "take-off," necessary to provide a surface that can be silvered. It is believed to be evident that a reduction in the amount of glass "take-off" necessary means a considerable savings of time, material and expense in producing glass of plate quality, and most particularly in the case of very thin glass, for example, in the order of about ⅛ inch thickness.

Secondly, if at least one surface is sufficiently flat and also sheen-free, then sheets from a glass ribbon so formed will be adaptable to certain commercial uses without any grinding and polishing of that surface. By reason of their flat, sheen-free condition, such unground and unpolished surfaces will afford optical properties usually associated only with a ground and polished surface. This advantage of eliminating grinding and polishing of at least one surface is of great importance.

In order to accomplish the aforedescribed, it is here pointed out that the glass supporting bed, to be discussed in detail as the specification proceeds, is downwardly inclined relative to the true horizontal. This novel inclination of the bed insures that the glass flatness will not be disturbed during the passage of the glass from the forming means to the conventional mechanical conveying means normally present in the lehr. This is of particular importance since it has been found that the surface characteristics of a glass ribbon are most easily altered during the time in which the ribbon is still in a plastic or semiplastic condition, that is, before the ribbon has hardened. By so inclining the support bed it has been found to be possible to substantially eliminate the adverse effects of the forces which normally destroy surface flatness of the ribbon after formation and thereby to achieve the sheen-free, smooth glass surface aforedescribed.

Therefore, it is a primary object of the present invention to provide a method and apparatus that will produce a continuous glass ribbon wherein at least one surface thereof is free from the surface defects normally requiring elimination by grinding and polishing and is thereof of substantially plate glass quality.

It is another object of the present invention to provide a method and apparatus that will produce a continuous glass ribbon wherein at least one surface thereof is flattened to a degree which will substantially reduce the glass "take-off" necessary to establish a surface suitable for silvering.

It is still another object of the present invention to provide an improved method and apparatus for supporting a continuous glass ribbon in a manner which will achieve the above objects.

Other objects and advantages of the invention will become apparent during the course of the following description when taken in connection with the accompanying drawings.

In the drawings, wherein like numerals are employed to designate like parts throughout the same:

FIG. 1 is a side elevation, partly in section and with parts broken away, of the novel glass heat treating and supporting means which are the subject of the present invention;

FIG. 2 is an enlarged fragmentary transverse vertical section of one supporting unit;

FIG. 3 is a cross-sectional view of the glass supporting means looking along the line of glass travel; and FIG. 4 is a schematic view illustrating the glass defect known as ballooning.

Referring now to the drawings, and in particular to FIG. 1, there is shown a melting tank 10 from which molten glass is formed into a continuous ribbon or sheet, of glass 11 by means of two counter-rotating rolls 12 mounted at the end of the tank. The ribbon or sheet of glass 11, after being formed by rolls 12, passes through heat treating means 13 along a predetermiend path.

According to the present invention, the heat treating means 13 is arranged along the path of, and disposed so as to define a closed passageway or tunnel for, the ribbon. This tunnel or heat treating means 13 includes a preliminary heating chamber 14, located adjacent the forming rolls 12, and an oven 15 extending between the preliminary heating chamber 14 and the lehr 16. The oven 15 encloses the glass ribbon during the major portion of its travel from the forming means 12 to the lehr 16, and the preliminary heating chamber 14 is disposed over the minor portion of the travel of the ribbon, being positioned between the forming means 12 and the entrance opening 17 in the front wall 18 of the oven 15.

The preliminary heating chamber 14 includes a lower enclosed section 19 and an upper enclosed section 20 arranged so as to entirely enclose the glass ribbon. The upper section 20 includes a movable hood 21 liftable by weights 22, connected by means of a cable 23 extending around fixed pulley 24, to the hood extension 25. The weights 22 are also used to adjust the relative distance between the upper surface 26 of the ribbon 11 and heating units 27 mounted thereabove, the heating units having individual heat controls 28 and being carried on the underside 29 of hood 21. This hood 21 is also vertically adjustable in order to vary the intensity of the heat treatment of the glass surface 26 and also so that, if desired, it can be raised well above the glass so that the glass ribbon 11 may be inspected through a door 30 in the walls of the upper section 20 before it enters the oven 15.

The preliminary heating chamber 14 also includes air flotation units 31 arranged below the ribbon and suitably supported in the lower section 19. These air flotation units 31 are shown in full line and are identical to the air flotation units 32 positioned in oven 15, which units 32 will be hereinafter described in detail. It therefore is to be understood that the detailed description of units 32, to be later presented, is considered to be equally applicable as the detailed description of these units 31, both units functioning and operating in an identical fashion.

Positioned between the preliminary heating chamber 14 and the oven 15 as aforementioned is the front wall 18 having the entrance opening 17 therein of sufficient size to allow the ribbon 11 to pass into the oven 15 with only a minimum clearance.

Disposed within the interior of the oven 15 and extending downwardly from the top wall 33 thereof are a series of heating units 34 similar to the aforediscussed units 27. Each unit 34 has individual heat controls 35 to vary the degree of heat emitted by the individual heaters. These heaters are also all slidably received within sleeves 36 so as to be adjustable vertically with respect to the glass surface 26 to thereby additionally vary the intensity of heat transmitted onto the glass 11. In the embodiment shown, this has been accomplished by hydraulic lifters 37 that are adapted to raise and lower the support platform or manifold 38 from which the heaters 34 are suspended.

Disposed below the glass are air flotation units 32, similar to units 31 aforementioned. These units 32 include a sectionalized layer, bed or blanket of porous material 39, to which the molten glass will not adhere, and a plurality of individual plenum chambers 40. The porous material 39, in fact, forms the upper or top wall of each chamber 40. Air is introduced into the chambers 40 to maintain therein a pressure of about one p.s.i. plus or minus ½ p.s.i., the air being supplied through conduits 41 connected by a main conduit 42 to a centrifugal blower 43. The air in the chambers passes through the porous material or bed 39 to form a cushion or film of air which supports the glass and prevents physical contact between the glass and the porous material. This air can be heated in any conventional manner such as by heaters 44 radiating heat onto the walls 45 to be conducted therethrough to heat the air within the chambers 40. These heaters 44 each have individual heat controls 46 so that accurate heat or temperature control of the air temperature in each chamber 40 is possible. A diffusion plate 47 is arranged within each chamber 40 so that the air follows the direction of arrows 48 and will not directly impinge upon the top porous wall or bed 39 of the plenum chambers 40.

Through the use of this plurality of heating units 27 and 34 above the ribbon and flotation units 31 and 32 therebelow, the glass ribbon passing from the forming rolls 12 to the lehr 16 is maintained close to the temperature at which it was formed. This provides maximum utilization of the residual heat within the glass and means that it is possible to avoid excessive reheating of the glass passing through tunnel 13 so that the glass surfaces can actually be flowed to flatten the surface by utilizing the residual heat in the glass plus additional external heat.

The glass surfaces, i.e. the upper surface 26 and the lower surface 49, are in fact reflowed in the oven 15 and in the preliminary heating chamber 14 so that any defects in either surface (i.e. either top or bottom), that were caused by contact with the forming rolls 12 will smooth out, resulting in perfectly flat surfaces. In this regard, it should be noted that the glass ribbon surfaces 26 and 49 should be initially formed in a manner calculated to provide the smoothest surfaces possible before the glass is introduced into the preliminary heating chamber 14. Thus, in order to achieve the maximum benefits from the present application, the surfaces 26 and 49 of the glass ribbon 11 entering into the preliminary heating chamber 14 and passing from there into oven 15 could be smoothed during formation, for example by providing either or both of the forming rolls 12 with a smooth peripheral glass-engaging surface. These smooth forming rolls would insure preliminary smoothing of the glass ribbon 11 to the extent that the glass at its conception will assume a reasonably smooth and flat state. It should be understood, however, that this preliminary smoothness is not to be confused with the smoothness evidenced by the ribbon surfaces 26 and 49 after the ribbon 11 has passed through oven 15 and preliminary heating chamber 14. However, in order that the final smoothness may be of the highest quality, it has been found to be desirable to introduce the ribbon 11 into the preliminary heating chamber 14 with the surfaces as smooth and as flat as is possible.

The glass surfaces 26 and 49, after being reflowed in the oven 15, have been found to be sheen-free and for certain purposes two blanks, formed from the ribbon produced by this method and apparatus, can be laminated together to provide a glass assembly affording all of the optical properties of plate glass but wherein at least the surfaces of the blanks in contact with the plastic material need not be ground and polished. In some cases, the blanks or the assemblies may be used without grinding or polishing either surface. In those special cases where grinding is absolutely necessary, for example because of subsequent silvering, the amount of glass "take-off" is substantially reduced.

In certain cases it may be desirable to place water pipes 50, positioned transversely of the glass, within the plenum chamber 40 of either the preliminary heating chamber 14 or the oven 15 and to cover or surround these pipes 50 with the porous material 39 as shown in FIG. 2. One reason for this would be where a combustible gas was to be directed through the porous material and ignited to form a fire flotation on cushion or film instead of the aforediscussed air flotation film. The water pipes 50 establish a combustion line so that the gas will burn only across the top surface of the porous bed. In this case it would be desirable to slot the surface of the trays as at 51 to provide an avenue of escape for the products of combustion to thereby avoid smothering of the flames. It should be remembered that when using either the air or the fire flotation aforedescribed in the oven 15 or in the preliminary heating chamber 14, it is desirable to provide a space 52 (FIG. 1) in the order of about ¼ inch between adjacent plenum chambers 40 so that the air or combustion products will have an open path of escape as illustrated by arrows 53 (FIG. 1).

In addition, it has also been observed that the edges 54 (FIG. 3) of the glass ribbon are cooler than the center section 55 thereof so that for a given air pressure in a plenum chamber, it is possible to over-support the center while under-supporting the edges. This causes an undesirable condition that can be referred to as sheet ballooning (shown generally at 56, FIG. 4). In order to prevent ballooning, the plenum chambers may be sectioned (FIG. 3) into individual units 57 to allow greater pressure on the edges 54, for example through the use of suitable control valves 58 for varying the pressure of the air passing through conduits 59 into the individual chambers 57. This could also be accomplished by making the top wall of each chamber 40 with greater porosity along the edges than at thhe center thereof. In either case, the greater float pressure is maintained on the edges 54 to insure ample support therefor without at the same time undesirably oversupporting the center portion 55 of the continuous ribbon 11. The upper heating units may also be sectionalized into individual units 60 as shown in FIG. 3 to provide control over the amount of heat transmitted to the glass across its width.

Positioned between the oven 15 and the lehr 16 is a vertically adjustable baffle wall 61. The wall 61 maintains the atmosphere in the heat treating chamber, defined by oven 15, distinct from that in the lehr 16 in which the glass is positively cooled to take its final solid form, and in this connection there has been provided only a minimum opening or clearance space 62 for the passage of the ribbon beneath the wall 61.

Turning now to a discussion of one of the most salient features of the present invention, it will be noted that the glass supporting bed formed by the porous upper surface or bed 39 of the associated units 31 and 32 is downwardly inclined relative to true horizontal on moving from the forming rolls 12 through the tunnel 13 and at least up to the lehr opening 62. The glass supporting bed, or plane of glass support, becomes truly horizontal again, in fact, only when the glass can be picked up by conventional rollers 63 without affecting the glass surface. Therefore, under certain conditions it may be desirable to extend the downwardly inclined bed of porous material 39 into the leading portion of the lehr 16 and to make suitable adjustments in the temperature treatment afforded by the plenum chambers associated with such a bed extension. In any case, the inclined flotation principle insures that the glass flatness achieved by reflowing the glass surfaces 26 and 49 is not disturbed and the glass is delivered to mechanical conveying means, i.e. rolls 63, only after the ribbon, particularly the surfaces thereof, has set into a hardened state where it will not be affected by conventional mechanical conveying means.

The amount by which the supporting bed must be inclined is influenced by a number of factors, among them being the thickness of the ribbon, the porosity of the material 39, whether the sheet is supported by air or by combustion gases, the thickness of the supporting film or cushion of air, and the temperature of the ribbon. According to the present invention, it has been found that under normal operating conditions this angle of inclination is generally between a minimum downward fall of about 1 inch, and preferably about 1 9/16 inches per hundred feet of lineal travel and a maximum of about 12 inches per hundred feet of lineal travel, although it is contemplated that under certain conditions it may be necessary for the inclination to fall outside of these limits. In order to present a clear explanation of the determination of these angular requirements, a brief explanation of the reasons for the downward inclination will now be presented.

It has been found that if a glass plate is supported upon a horizontal porous surface having air forced therethrough to form a film or supporting blanket, such as that described in the aforementioned U.S. Patent No. 2,878,621, the glass plate tends to shift across the supporting bed in an unpredictable, random fashion. Thus, a ribbon passing along a horizontal supporting bed from the forming rolls in a plastic state would normally be stretched and deformed by the tendency toward random motion and the pulling action of the lehr rolls 63 thereon. However, if the support plane determined by the bed is tilted or inclined downwardly in the direction of desired movement, gravity will tend to cause the glass resting on the air film to follow the tilt and slide along in the direction thereof. Furthermore, if the proper angle of inclination is chosen to balance the retarding effect of friction between the ribbon and the supporting air film, the ribbon will move along in the desired direction at a constant velocity. If the angle of tilt of the support plane is below the necessary minimum, then the glass will not shift in the direction of the inclination but will shift unpredictably or in the same random manner as if there was in fact no inclination at all. On the other hand, if the angle of tilt is much greater than that necessary to overcome the effect of friction, the glass will develop an excessive velocity. When this latter fact is related to the fact that the glass is being emitted at a constant rate by the forming rolls 12, it will be seen that a tendency toward excessive velocity will stretch the continuous ribbon and thereby cause highly undesirable ribbon thickness variations as well as ballooning of the ribbon.

If the inclination angle is, however, maintained between the proper limits, then the glass will be floated along the predetermined path without being subjected to the forces which normally influence surface flatness after formation of the ribbon, namely, the pulling force of the rolls 63, the pushing force of the glass leaving the forming rolls 12, or the weight of the glass. The glass ribbon, therefore, is carried along in a truly suspended or floating state free from the forces that tend to induce surface defects or thickness irregularities.

This is of prime importance since it allows heat treatment of both glass surfaces, i.e. 26 and 49, through the heating means disposed above and below the ribbon without the surfaces being distorted by external forces or subjected to stresses or strains that might induce surface defects. It will be understood that the glass is cooled either in the exit zone of the oven 15 or in the leading zone of the lehr 16 to the extent necessary to insure that the glass can be supported on mechanical conveying means, i.e. rolls 63, without affecting the prior flattened or smoothed surfaces. In the latter case, as the glass is carried through the lead sections of the annealing lehr 16, or in certain cases as it is carried through the entire lehr, it may be supported in a truly suspended state on the porous bed 39 aforedescribed if the bed be extended.

Therefore there has been provided a method and apparatus in which a continuous glass ribbon may be formed and in which the glass surfaces are heat treated to establish near perfect flatness by forming and annealing the surfaces under conditions of quiescence after having eliminated all stresses and strains upon the sheet.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. In a method of producing a continuous glass ribbon wherein the glass ribbon after formation moves along a continuous path from ribbon forming means into and through an annealing lehr in which the glass is hardened, the steps of supporting said ribbon between said forming means and said annealing lehr upon a supporting bed inclined downwardly from true horizontal by an amount sufficient to create a gravitational force adequate to substantially balance the retarding effect of friction upon said ribbon, and interposing a film of fluid under pressure between the upper surface of the supporting bed and the undersurface of the glass ribbon.

2. A method of producing a continuous glass ribbon as claimed in claim 1, wherein said film of fluid is created by continuously burning combustible gas between said upper surface of the supporting bed and said undersurface of the glass ribbon.

3. A method of producing a continuous glass ribbon as claimed in claim 1, including providing greater support through said fluid film at the relatively cooler edges of said ribbon than at the center thereof to prevent ballooning of said ribbon.

4. In a method of producing a glass ribbon wherein the glass ribbon after formation moves along a continuous path from ribbon forming means into and through an annealing lehr in which the glass is hardened, the step of supporting said ribbon by a supporting bed inclined at a slight downward angle from true horizontal between said ribbon forming means and said annealing lehr, the upper surface of said inclined supporting bed having a minimum fall of 1 9/16 inches for 100 feet of lineal travel and a maximum fall of 1 foot for 100 feet of lineal travel.

5. A method of producing a continuous glass ribbon as claimed in claim 4, including the step of interposing a film of air between the upper surface of the supporting bed and the undersurface of the glass ribbon.

6. In a method of producing a glass ribbon wherein the glass ribbon after formation moves along a continuous path from ribbon forming means into and through an annealing lehr in which the glass is hardened, the step of supporting said ribbon by a supporting bed inclined at a slight downward angle from true horizontal between said ribbon forming means and said annealing lehr, and interposing a film of air under pressure between the upper surface of the supporting bed and the undersurface of the glass ribbon, the upper surface of said inclined supporting bed having a minimum fall of 1 9/16 inches for 100 feet of lineal travel and a maximum fall of 1 foot for 100 feet of lineal travel.

7. A method of producing a continuous glass ribbon as claimed in claim 6, including the steps of heating the air film before said air film is interposed between the upper surface of the supporting bed and the undersurface of the glass ribbon, enclosing at least the air space over the glass ribbon, and applying heat within the enclosed space directly onto the upper surface of the glass ribbon.

8. Apparatus for producing a continuous glass ribbon comprising, in combination, means for forming a continuous glass ribbon, a relatively long oven having means therein for heating the formed ribbon, an annealing lehr through which the glass ribbon passes to be hardened, a glass supporting bed in said oven extending substantially the length of the oven between said forming means and said lehr for supporting said ribbon as it advances from said forming means into said lehr, and means for interposing a film of fluid under pressure between the upper surface of the supporting bed and the undersurface of the glass ribbon, said supporting bed being uniformly downwardly inclined from true horizontal along its entire length by an amount sufficient to create a gravitational force substantially balancing the frictional retarding force on said ribbon.

9. Apparatus for producing a continuous glass ribbon as claimed in claim 8, wherein said downwardly inclined supporting bed includes a glass supporting portion formed of a porous material, said glass supporting portion having greater porosity along the edges of said downwardly inclined bed than at the center thereof, and said means for interposing a film of fluid includes means for passing fluid through said porous material whereby said fluid film provides greater support for said glass ribbon at the relatively cooler edges than at the center thereof.

10. Apparatus for producing a continuous glass ribbon as claimed in claim 8, wherein said supporting bed includes a plurality of individual plenum chambers positioned in side by side relationship across said supporting bed, each said plenum chamber including a porous upper surface and a pressure chamber in communication with said porous surface for receiving fluid under pressure to form said fluid film, and means for regulating the fluid pressure in each said chamber to provide greater support at the edges of said ribbon than at the center thereof.

11. Apparatus for producing a continuous glass ribbon comprising, in combination, means for forming a continuous glass ribbon, a relatively long oven having means therein for heating the formed ribbon, an annealing lehr through which the glass ribbon passes to be hardened, a glass supporting bed in said oven extending substantially the length of the oven between said forming means and said lehr for supporting said ribbon as it advances from said forming means into said lehr, and means for interposing a film of air under pressure between the upper surface of the supporting bed and the under surface of the glass ribbon, said bed being uniformly downwardly inclined from true horizontal along its entire length with a minimum fall of 1 9/16 inches for 100 feet of lineal travel and a maximum fall of 1 foot for 100 feet of lineal travel.

12. In apparatus for producing a continuous glass ribbon as claimed in claim 11, a heat treating tunnel enclosing the ribbon as it moves over the downwardly inclined bed, said tunnel including a preliminary heating chamber adjacent the ribbon forming means through which the formed ribbon passes, said oven extending from the preliminary heating chamber to the annealing lehr, said inclined bed being positioned in said oven and supporting the ribbon during a major portion of its travel through the oven.

13. Apparatus for producing a continuous glass ribbon as claimed in claim 12, wherein said downwardly inclined bed includes a glass supporting portion formed of a porous material, said oven and said preliminary heating chamber both including means for passing air through said porous material to form an air film between the upper surface of the porous material and the lower surface of the glass ribbon passing across said porous material, means for heating the air to an elevated temperature, and heating means disposed above the glass to direct heat onto the upper surface of the glass.

References Cited
UNITED STATES PATENTS

| | | | |
|---|---|---|---|
| 1,199,108 | 9/1916 | Peiler | 65—25 |
| 1,616,405 | 2/1927 | Avery | 65—65 |
| 1,638,593 | 8/1927 | Mulholland | 65—25 |
| 1,827,138 | 10/1931 | Brancart | 65—25 |
| 2,444,731 | 7/1948 | Devol | 65—25 |
| 2,878,621 | 3/1959 | Zellers et al. | 65—182 |
| 2,911,759 | 11/1959 | Pilkington et al. | 65—182 |

DONALL H. SYLVESTER, *Primary Examiner.*

D. CRUPAIN, F. MIGA, *Assistant Examiners.*